US011140060B2

(12) United States Patent
Ni et al.

(10) Patent No.: US 11,140,060 B2
(45) Date of Patent: Oct. 5, 2021

(54) DYNAMIC VARIATION OF MEDIA SEGMENT DURATIONS FOR OPTIMIZATION OF NETWORK ROUND TRIP TIMES

(71) Applicant: HULU, LLC, Santa Monica, CA (US)

(72) Inventors: Shun Ni, Beijing (CN); Aleksandar Zambelli, Seattle, WA (US); Shenglan Huang, Beijing (CN); Deliang Fu, Beijing (CN); Wenhao Zhang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 16/681,592

(22) Filed: Nov. 12, 2019

(65) Prior Publication Data

US 2021/0144080 A1    May 13, 2021

(51) Int. Cl.
*H04L 12/26* (2006.01)
*H04N 21/2365* (2011.01)
*H04N 21/238* (2011.01)

(52) U.S. Cl.
CPC .......... *H04L 43/16* (2013.01); *H04L 43/0841* (2013.01); *H04L 43/0894* (2013.01); *H04N 21/23655* (2013.01); *H04N 21/23805* (2013.01)

(58) Field of Classification Search
CPC . H04L 43/16; H04L 43/0894; H04L 43/0841; H04N 21/23805; H04N 21/23655
See application file for complete search history.

(56) References Cited

U.S. PATENT DOCUMENTS

| 8,085,781 | B2* | 12/2011 | Munson | H04L 47/34 370/394 |
| 8,601,153 | B2* | 12/2013 | Choudhury | H04N 21/41407 709/236 |
| 9,282,135 | B2* | 3/2016 | L'Heureux | H04L 67/02 |
| 9,438,653 | B2* | 9/2016 | De Vleeschauwer | H04L 65/60 |
| 9,596,281 | B2* | 3/2017 | Luby | H04L 65/60 |
| 9,769,239 | B2* | 9/2017 | Ulupinar | H04L 41/14 |
| 9,794,311 | B2* | 10/2017 | Mao | H04L 67/02 |
| 9,917,874 | B2* | 3/2018 | Luby | H04N 21/234327 |
| 10,652,166 | B2* | 5/2020 | Bowen | H04L 65/80 |
| 10,749,918 | B2* | 8/2020 | MacInnis | H04L 65/602 |
| 10,771,833 | B2* | 9/2020 | Arye | H04L 65/4084 |
| 2010/0235473 | A1* | 9/2010 | Koren | H04W 4/50 709/219 |
| 2011/0066676 | A1* | 3/2011 | Kleyzit | H04L 67/02 709/203 |
| 2013/0227102 | A1* | 8/2013 | Beck | H04L 65/608 709/223 |

(Continued)

*Primary Examiner* — Patrice L Winder
(74) *Attorney, Agent, or Firm* — Fountainhead Law Group P.C.

(57) ABSTRACT

In some embodiments, a method analyzes information regarding a round-trip time where the round-trip time is based on sending a request for a segment of a media program and receiving the segment of the media program. The method determines when to switch from requesting a single segment of the media program to sending a request that requests a plurality of segments of the media program. When switching from requesting the single segment of the media program, the request for the plurality segments of the media program is sent where at least two or more of the segments are received without sending a subsequent request for the two or more segments.

20 Claims, 12 Drawing Sheets

(56) References Cited

U.S. PATENT DOCUMENTS

| | | | |
|---|---|---|---|
| 2016/0094608 A1* | 3/2016 | Sundararajan | H04L 65/1083 709/219 |
| 2016/0381177 A1* | 12/2016 | Minder | H04L 67/16 709/226 |
| 2018/0367847 A1* | 12/2018 | Brinkley | H04N 21/2668 |
| 2020/0028931 A1* | 1/2020 | Zhu | H04L 65/607 |

* cited by examiner

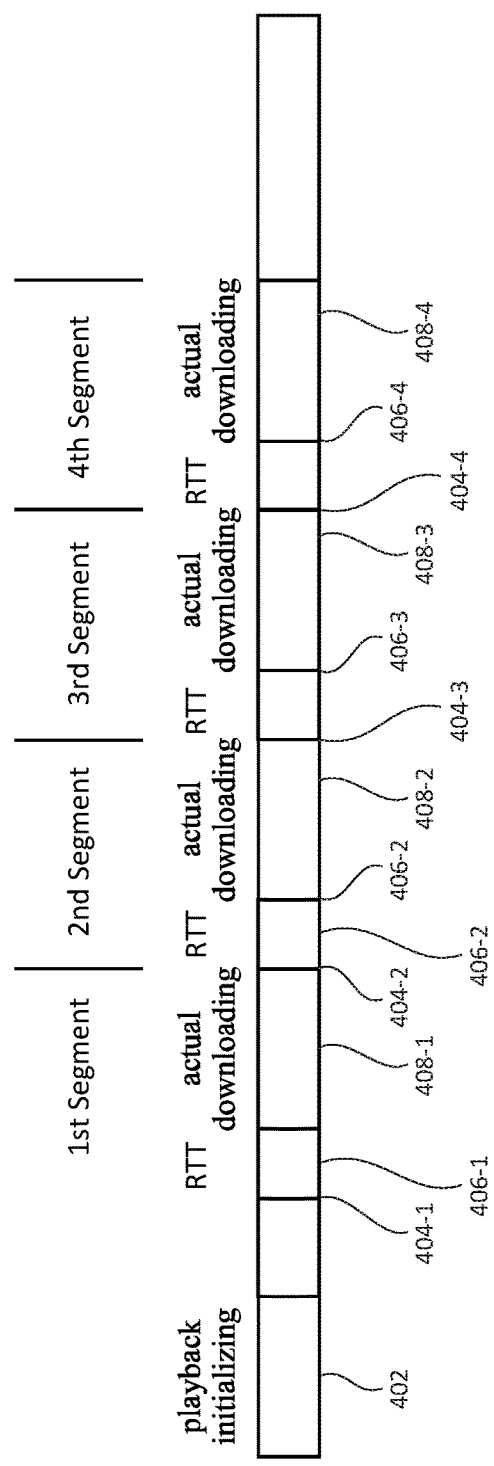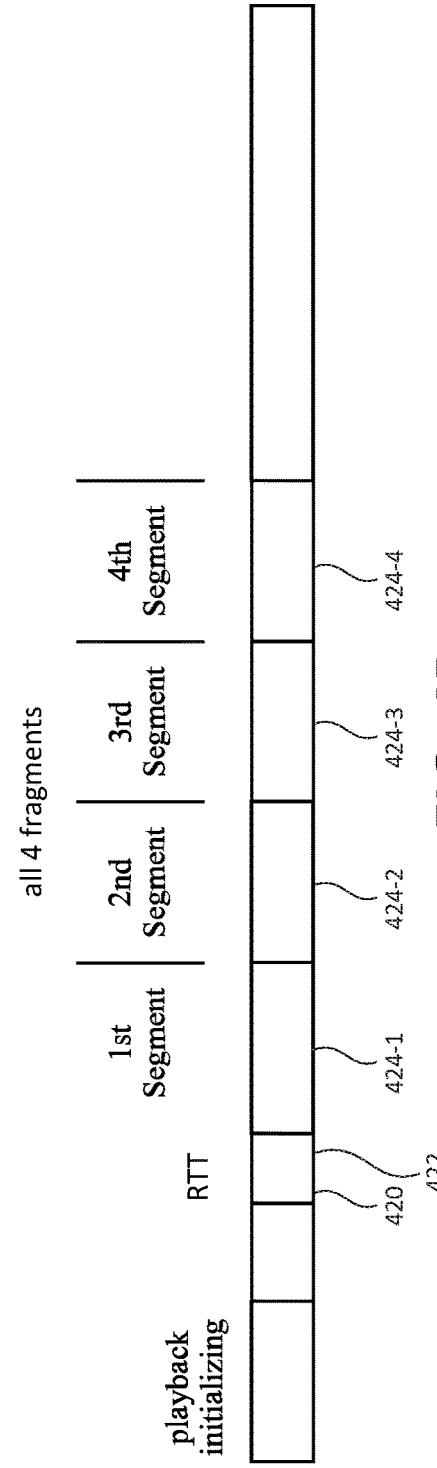

DYNAMIC VARIATION OF MEDIA SEGMENT DURATIONS FOR OPTIMIZATION OF NETWORK ROUND TRIP TIMES

BACKGROUND

A media program may be transcoded into different profiles, such as different quality levels that affect the bitrate of the associated media program. A media program is segmented into multiple segments that last for a period of time, such as several seconds. A media program transcoded in a higher bitrate profile may use more bandwidth to send a segment of media program than a media program transcoded in a lower bitrate profile. The lower bitrate profile may be perceived as a lower video quality than the higher profile, and uses less bandwidth to transmit. A media player may use a protocol, such as Dynamic Adaptive Streaming over HyperText Transfer Protocol (DASH) or HyperText Transfer Protocol (HTTP) Live Streaming (HLS) to request segments. The media player requests segments of the media program sequentially. For example, the media player may send a request for a first segment, and subsequently receives the first segment for playback. After requesting the first segment, the media player may send a request for a second segment, and will subsequently receive the second segment.

Adaptive bitrate streaming (ABR) allows a media player to switch between different profiles to improve the playback experience. At certain times, the media player may experience variations in available bandwidth; for example, the available bandwidth may decrease. When this occurs, if a profile that requires a large amount of bandwidth to send a segment is currently being used, the media player may experience playback issues, such as re-buffering. Re-buffering is when media program playback stalls in the middle of playback due to a buffer underrun, which may occur, for instance, where there is not enough video in the buffer to support playback of the media program. That is, the video is not being received fast enough to fill the buffer for uninterrupted playback. Using adaptive bitrate streaming, the media player may switch to a profile that requires less bandwidth to transmit a segment. This may alleviate the playback issues associated with re-buffering because more video may be received in the same amount of time, but the video quality may suffer because the profile selected may be for a media program that has been transcoded with a lower quality.

BRIEF DESCRIPTION OF THE DRAWINGS

FIG. 4A depicts an example of performing a serial download of single segments of a media program according to some embodiments.

FIG. 4B shows an example of a batch request according to some embodiments.

DETAILED DESCRIPTION

Figure 1:
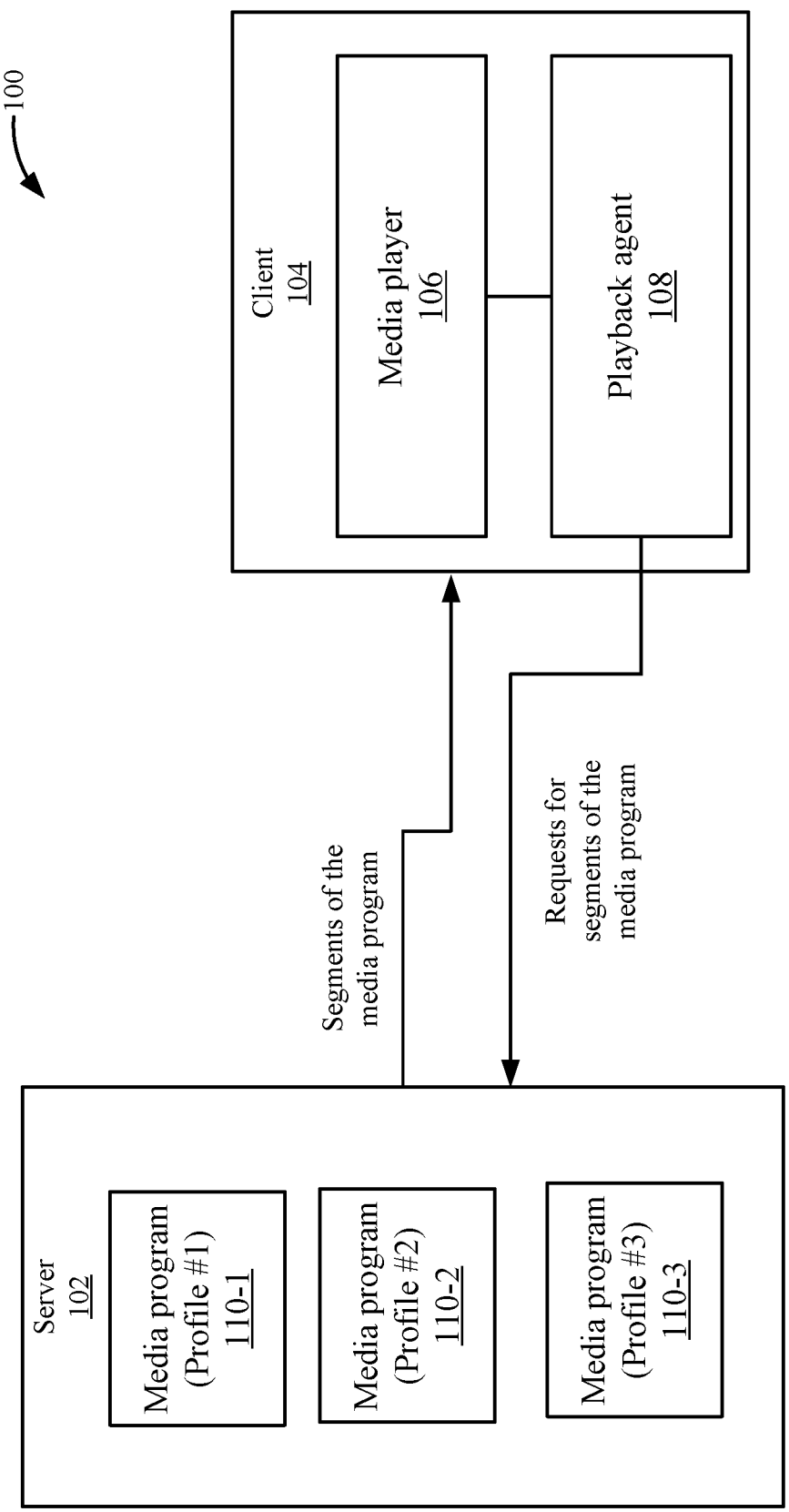
FIG. 1 depicts a simplified system for sending media programs according to some embodiments.

Described herein are techniques for a media player system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

A server may be able to deliver various media programs, such as a video (e.g., a title or show) that have been (or will be) transcoded in multiple profiles. When a media program is referred to, the media program may include video and/or audio. In some cases, due to various factors, a media player may switch to a different profile during playback of a media program. For example, a media player may measure a round-trip time (RTT), which may be based on a first time in which a request is sent for a segment and a second time in which data for a segment of the media program is received. In some embodiments, the round-trip time does not include the time to download the data for the segment. The data for the segment is then downloaded. An adaptive bitrate (ABR) streaming process may consider the round-trip time when calculating the available bandwidth when downloading segments of the media program. The adaptive bitrate streaming process uses the available bandwidth to determine when to switch profiles. When individual segments are downloaded serially, a large round-trip time may reduce the average download speed in a significant way, which reduces the available bandwidth that is calculated. When the adaptive bitrate process considers the round-trip time in calculating the available bandwidth, a large round-trip time may cause the adaptive bitrate streaming process to switch to a lower quality video profile for subsequent segments to download. A switch is performed because the round-trip time may be long, which causes the available bandwidth calculation to be lower.

In view of the above problem, the media player may determine when it is possible to send a batch request for multiple segments. For example, the media player may send a request for more than one segment, such as four segments of the same profile, in one request. Then, a server may process the request and send all four segments without requiring the media player to send another request. This saves a number of round-trip times, which may be important when the round-trip time is high. The average download speed is a factor in the playback experience in that a higher download speed may ultimately lead to a higher video quality. Improving the download speed is important and provided using a batch request. By saving the round-trip times with a batch request, the media player may avoid having to switch to a lower quality profile, thereby improving video quality.

In some embodiments, while the requested segments are being downloaded in a batch request, the media player may determine that the batch request should be aborted. For example, the media player may determine that network conditions have changed, such as there may be less available bandwidth. The decrease in available bandwidth may typically cause the adaptive bitrate streaming process to switch to a different profile, such as a profile with lower quality video. However, because a batch request has been sent, the server is configured to send multiple segments of the same profile. If the segments are received at the same profile while available bandwidth has decreased, video playback problems may occur, such as re-buffering. Accordingly, the media player may abort the batch request and send a request for a segment with a profile that may have a lower video quality.

System Overview

FIG. 1 depicts a simplified system 100 for sending media programs according to some embodiments. System 100 includes a server 102 and a client 104. Although one instance of server 102 and client 104 are shown, multiple instances of server 102 and client 104 may be used.

In one example, server 102 may be able to deliver various media programs that have been (or will be) transcoded in multiple profiles. A media program 110 is divided into segments that a transcoder encodes for multiple profiles in different versions of the media program. As shown, a media program 110 is stored in different versions as media program 110-1 (e.g., a high bitrate profile #1), media program 110-2 (e.g., a medium bitrate profile #2), . . . , and media program 110-3 (e.g., a low bitrate profile #3). The different profiles provide videos at different bitrate levels. For example, a profile may transcode media program 110 differently, such as in a high bitrate, medium bitrate, and a low bitrate. As bitrate decreases, the perceived quality level may be lower due to a reduction in resolution. The profiles may be defined in terms of different formats of 1080P, 720P, and 480P. The designation of 1080P, 720P, and 480P represent a number of pixels that are displayed and the method of scanning when playing back the video, and include different quality levels. The designations may have different bitrates, such as the 1080P version may have more pixels and use more bandwidth to transmit than the 720P and 480P versions, which have fewer pixels. In some respects, the 1080P profile could be considered the high bitrate profile, the 720P the medium bitrate profile, and the 480P profile the low bitrate profile. Although the above profiles are discussed, other profiles that include different characteristics may be used. The different characteristics may result in a different number of bytes that are sent and a different amount of bandwidth that is needed to send the media program.

Client 104 may include various user devices, such as cellular phones, set top boxes, streaming devices, personal computers, tablet computers, etc. Client 104 may include a media player 106 that can play media program 110. For example, media player 106 may play video and/or audio.

Client 104 receives media program 110 from server 102. For example, client 104 (e.g., media player 106) may request segments of media program 110 from server 102. While receiving the segments of media program 110, client 104 can evaluate the bandwidth used to receive the segments. One evaluation client 104 may perform is to measure the amount of the media program (e.g., bytes of video) received over a period of time to estimate the available bandwidth. Client 104 may use a period of time that is based on the round-trip time and the time used to download a segment of video.

A playback agent 108 may control various aspects of the video playback. For example, playback agent 108 may determine when to switch profiles when requesting segments of media program 110 based on the adaptive bitrate streaming process. Also, as will be described in more detail below, playback agent 108 may determine when a batch request for multiple segments should be sent. The batch request may be sent when various network conditions occur during playback, such as when a round-trip time is high. Other network conditions may also be analyzed, such as playback agent 108 may analyze the characteristics of the network bandwidth including whether network bandwidth is stable or high. Also, playback agent 108 may determine a number of segments that may be requested in the batch request based on the network conditions. It is noted that a batch request may request multiple segments from the same profile and not different profiles. Alternatively, playback agent 108 may select different profiles for different segments in the batch request. For example, playback agent 108 may switch to a lower bitrate profile if playback agent 108 predicts that available bandwidth might go down. The batch request will be described in more detail below.

Video Transcoding

Figure 2:
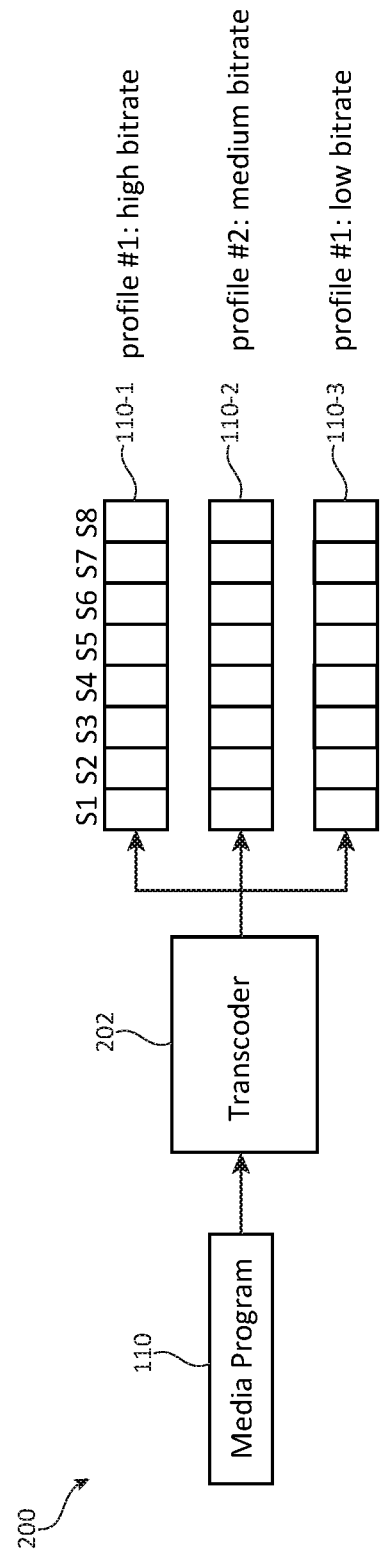
FIG. 2 depicts a simplified system for transcoding a media program according to some embodiments.

FIG. 2 depicts a simplified system 200 for transcoding a media program 110 according to some embodiments. A transcoder 202 receives a media program 110, such as a single media program in a file. Media program 110 may be in a first format. Then, transcoder 202 then transcodes media program 110 into different profiles, such as a profile #1 at 110-1, a profile #2 at 110-2, and a profile #3 at 110-3. Each profile may include different video characteristics that may affect the video quality and the bitrate of the media program.

Each profile may be segmented into segments, such as segments S1, S2, S3, . . . S8. Although eight segments are shown, any number of segments may be used. Each media program 110 may include the same number of segments, but the transcoded video in the segments may include different characteristics as discussed above. Each segment is a fragment of the video which lasts for a period of time. The segment may be a basic download unit by media player 106. That is, when operating in a mode that does not send batch requests, media player 106 sends a request for each individual segment sequentially.

Adaptive Bitrate Process

Figure 3:
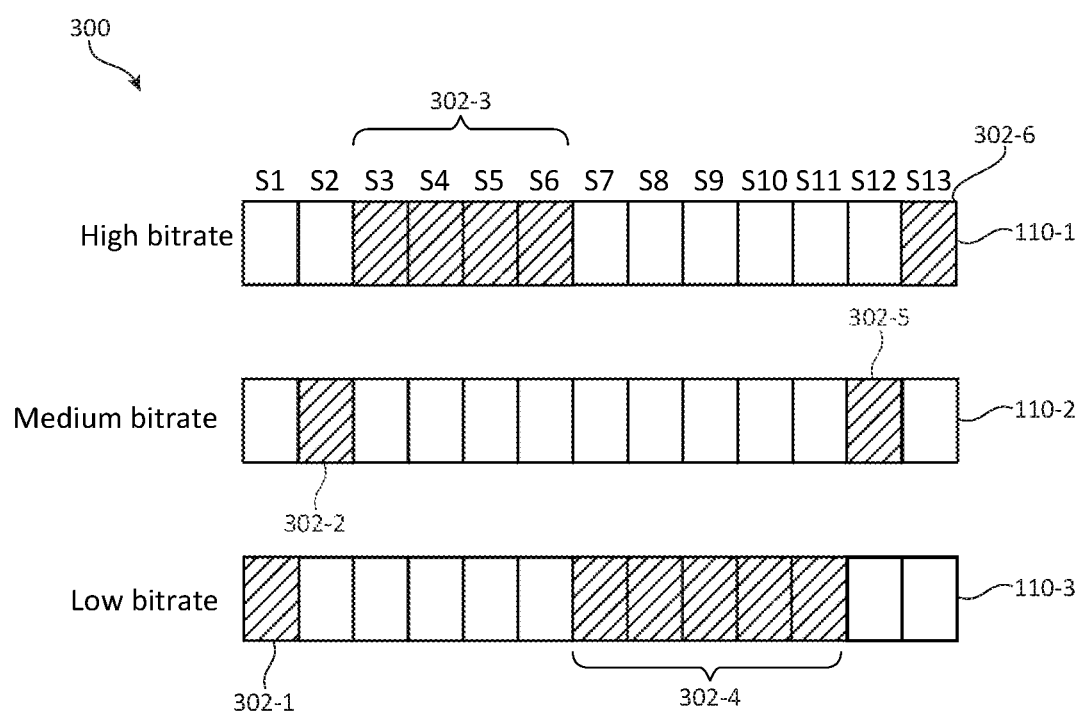
FIG. 3 depicts a conceptual view of the playback of the media program according to some embodiments.

As discussed above, the adaptive bitrate (ABR) streaming process may switch between different profiles while playing back media program 110. FIG. 3 depicts a conceptual view 300 of the playback of media program 110 according to some embodiments. Media player 106 continuously downloads sequential segments from media program 110 into a buffer. From the buffer, media player 106 retrieves the segments and displays the segments during video playback. When network conditions change, playback agent 108 uses an adaptive bitrate streaming process to switch video profiles for subsequent segments to download.

In FIG. 3, profiles at 110-1, 110-2, and 110-3 are shown with associated segments. Media player 106 downloads segments S1, S2, S3, and so on sequentially. For each segment, media player 106 may select from profiles at 110-1, 110-2, and 110-3. The selection is based on playback agent 108 analyzing network conditions to determine which media program 110 is optimal for the network conditions. For example, if the network conditions indicate the available bandwidth is low, then playback agent 108 may select media program 110-3 because downloading a segment from media program 110-3 may use less bandwidth. However, if available bandwidth is high, downloading a segment from media program 110-1 may be better because the available bandwidth can handle downloading the segment and video quality will be higher than a segment from media program 110-3.

In FIG. 3, segments that media player 106 download from the different profiles are shown with slash lines. For example, at 302-1, media player 106 downloads segment S1 from media program 110-3. Then, playback agent 108 may determine that available bandwidth is higher and may support playback of a segment from media program 110-2 without re-buffering. At 302-2, media player 106 downloads a segment S2 from media program 110-2. Still, playback agent 108 determines that the available bandwidth may support downloading segments from media program 110-1. Accordingly, at 302-3, media player 106 downloads segments S3, S4, S5, and S6, individually and sequentially, from media program 110-1.

At this point, available bandwidth may decrease, and playback agent 108 determines that segments from media program 110-3 should be downloaded. Accordingly, at 302-4, media player 106 downloads segments S7, S8, S9, S10, and S11 from media program 110-3. Subsequently, media player 106 downloads segment S12 at 302-5 from media program 110-2 and segment S13 at 302-6 from media program 110-1. In this case, available bandwidth may have increased and playback agent 108 selected media program 110-2 and media program 110-1 in which to download segments.

Round-Trip Time

In a first mode, media player 106 serially downloads segments one-by-one. The total time to download a segment may include a round-trip time and the actual transfer time to transfer the data for the segment. The round-trip time may be based on the time in which the segment is sent to the first byte that is received for the segment. However, other round-trip time calculations may be performed, but are based on sending a request for a segment. For example, a round-trip time may be a time between when a request is sent to receiving X amount of data. The actual data transfer time may be based on the time taken to download bytes for the segment.

FIG. 4A depicts an example of performing a serial download of single segments of a media program 110 according to some embodiments. At 402, media player 106 initializes playback of the media program 110. At 404-1, playback begins when media player 106 sends a request for a first segment. A round-trip time occurs at 406-1 between the time of the request and the time in which a first byte of the first segment is received. Then, at 408-1, the downloading of the first segment occurs. Similarly, after the downloading of the first segment, at 404-2, media player 106 sends a request for a second segment. A round-trip time occurs at 406-2 between sending the request and receiving the first byte of the second segment. The downloading of the second segment then occurs at 408-2. The process continues for the third segment and the fourth segment. For example, a request for the third segment is sent at 404-3, a round-trip time occurs at 406-3, and the downloading of the third segment occurs at 408-3. Similarly, media player 106 sends a request for the fourth segment at 404-4, a round-trip time occurs at 406-4, and the downloading of the fourth segment occurs at 408-4. This process may continue for additional segments of media program 110.

In some embodiments, in a second mode, playback agent 108 may merge multiple segment requests into a batch request. This may save multiple round-trip times, such as round-trip times of 406-2, 406-3, and 406-4 in FIG. 4A.

FIG. 4B shows an example of a batch request according to some embodiments. At 420, media player 106 sends a batch request for multiple segments, such as the four segments described above in FIG. 4A. At 422, a round-trip time occurs between sending the batch request and receiving the first byte for first segment. At 424-1, media player 106 downloads the first segment. Then, instead of incurring a second round-trip time between downloading the first segment and the second segment, because the batch request requested four segments, a round-trip time is not incurred. Accordingly, at 424-2, media player 106 downloads the second segment. Subsequently, media player 106 downloads the third segment and the fourth segment without requiring a round-trip time in between the second segment and the third segment, and in between the third segment and the fourth segment. Accordingly, the batch request saved three round-trip times to download the four segments.

In some embodiments, the use of the batch request may be useful when the round-trip time is high. If the round-trip time is low, the benefits may not be as high and save as much time, but some benefits may still be experienced. As will be discussed in further detail below, depending on the stability of the network bandwidth, playback agent 108 may determine a number of segments to request in the batch request.

Segment Request Process

Figure 5:
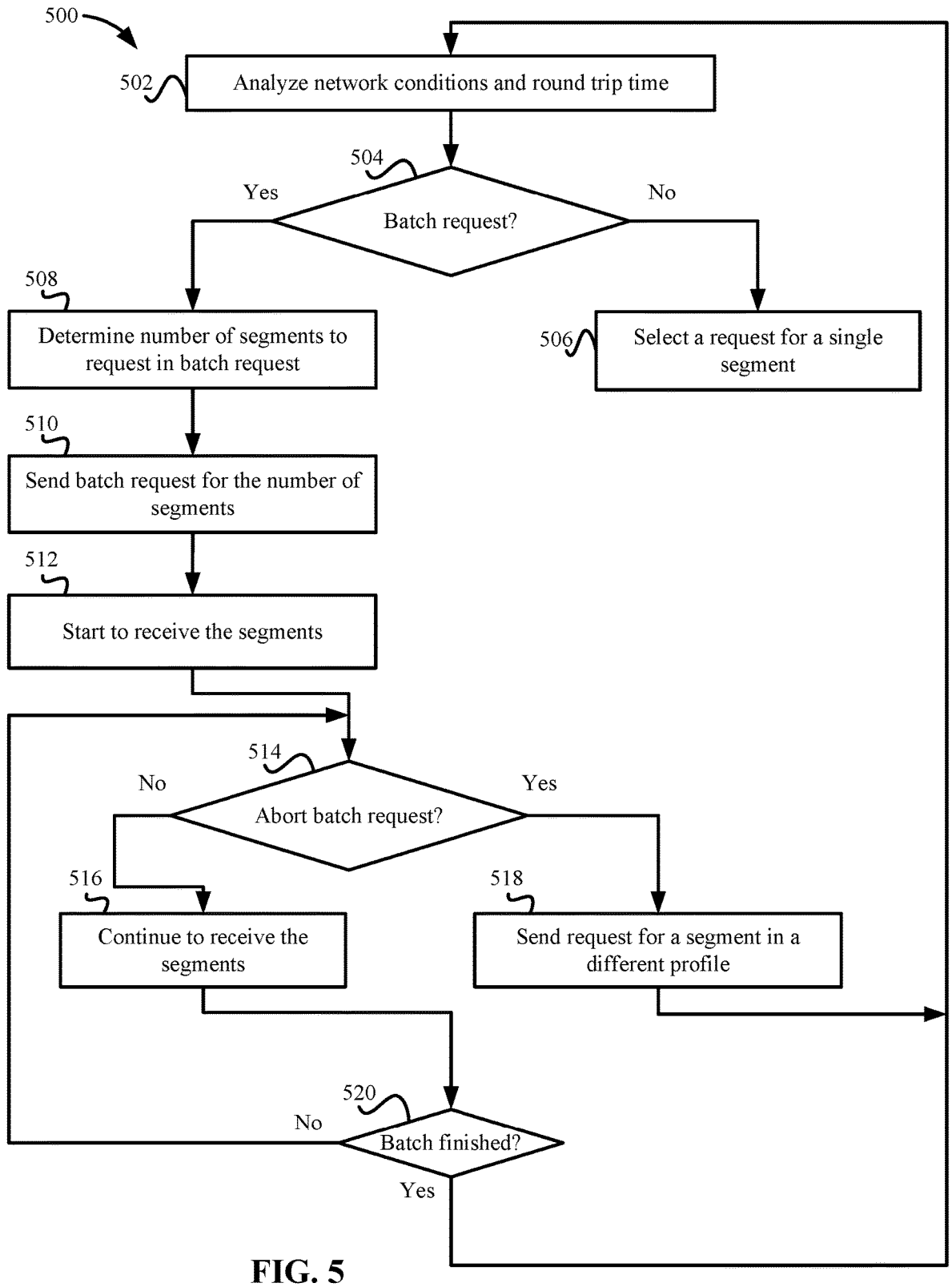
FIG. 5 depicts a simplified flowchart of a method for requesting segments according to some embodiments.

FIG. 5 depicts a simplified flowchart 500 of a method for requesting segments according to some embodiments. At 502, playback agent 108 analyzes the network conditions and the round-trip times. The network conditions and round-trip times may be from historical data, such as data from requesting and downloading segments of the current media program 110 being played back. For example, the last X round-trip times and network conditions may be used. Also, the network conditions and round-trip times may be from playback of other media programs. However, using more current network conditions and round-trip times may more accurately provide the information needed to determine whether to perform a batch request.

At 504, playback agent 108 determines whether to perform a batch request. If not, at 506, playback agent 108 selects a request for a single segment. Media player 106 may then send a request for a single segment.

If a batch request is to be used, at 508, playback agent 108 determines a number of segments to request in the batch request. The number of segments may be based on different factors, such as the playback characteristics and the round-trip time. For example, if the round-trip time is very high and/or the network bandwidth has been stable, then playback agent 108 may select a larger number of segments to request in the batch request. However, if the round-trip time is lower and/or the network bandwidth has been unstable, then playback agent 108 may select a smaller number of segments to include in the batch request. The smaller number of segments may be included because the effective round-trip time may be smaller and less of an advantage is gained by using the batch request. Also, if network bandwidth is unstable, it is possible that conditions may change during the downloading of the segments in the batch request, which may adversely affect playback during the batch request. For example, if available bandwidth goes down during the downloading of multiple segments in a batch request, it is possible that if the rest of the segments for the profile that was requested in the batch request were to be downloaded, rebuffering may result.

After determining the number of segments, at 510, media player 106 sends a batch request for a number of segments. Then, at 512, media player 106 starts to receive the segments.

As discussed above, certain conditions may change, such as the available bandwidth, and playback agent 108 may want to abort the batch request before all segments that were requested in the batch request are received. Thus, at 514, playback agent 108 determines whether to abort the batch request. If not, then at 516, media player 106 continues to receive the segments. At 520, playback agent 108 determines if the batch request has finished and that all segments have been received. If not, the process continues at 514 to continue to consider whether to abort the request. If the batch has finished, then the process continues at 502. In this case, if the batch request ends, media player 106 may revert back to requesting single segments of media program 110 until another batch request is determined by playback agent 108.

However, if the batch request should be aborted, at 518, media player 106 sends a request for a segment in a different profile than that was requested in the batch request. For example, media player 106 may send a request for a single segment in a profile that uses less bandwidth.

Playback Agent

The following will describe different variations of the batch request. For example, the batch request may be different depending on whether media player 106 is downloading a video-on-demand (VOD) video or downloading a live video. A live streaming server 102 may continuously receive segments of media program 110 from a live video encoder, whereas in an on-demand streaming media program 110 may be stored in its entirety as a single file on the server 102. Although the following formats for requesting the video-on-demand media program and the live media program are described, it is noted that other methods may be appreciated.

Figure 6:
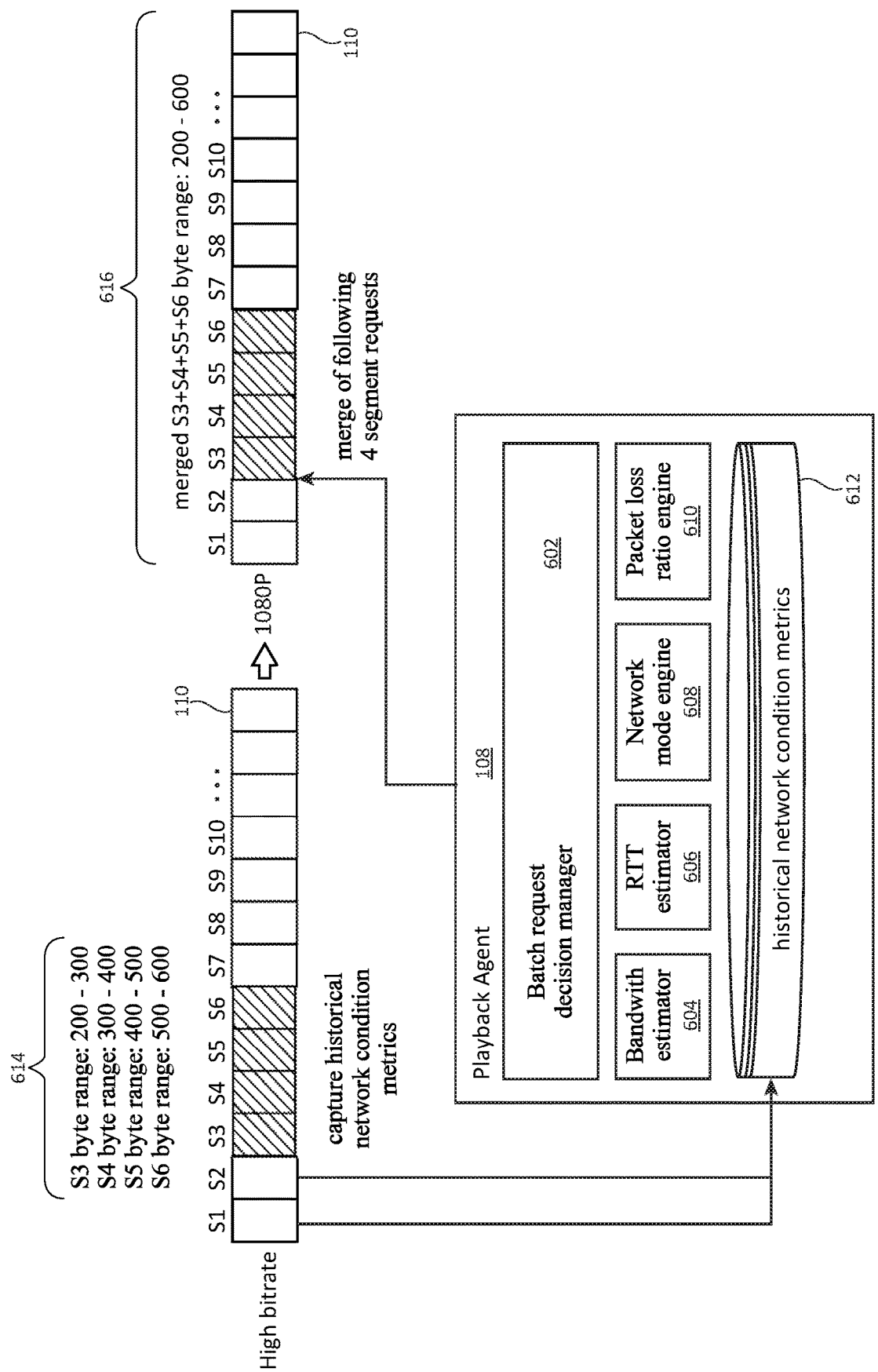
FIG. 6 depicts a more detailed example of a playback agent for a video-on-demand playback according to some embodiments.

FIG. 6 depicts a more detailed example of playback agent 108 for a video-on-demand playback according to some embodiments. Playback agent 108 includes a batch request decision manager 602 that may determine when to perform a batch request. Batch request decision manager 602 may use various engines that may analyze network conditions. For example, a bandwidth estimator 604 may estimate the available bandwidth. A round-trip time estimator 606 may estimate the round-trip time being experienced. A network mode engine 608 detects how client 104 is connected to a network, such as the Internet (whether it is via a cellular network, WiFi, or Ethernet, etc.). In these different scenarios, playback agent 108 might adopt different parameters when judging network bandwidth and stability. A packet loss ratio engine 610 may be analyzing the packet losses being experienced. A database 612 may store historical network condition metrics either for the current media program being played back and/or other media programs that were previously downloaded.

When a media program 110 is being played back, historical network condition metrics for segments that are downloaded are included in database 612. For example, segments S1 and S2 have been downloaded and statistics for the downloading of those segments is stored in database 612. The historical network condition metrics may be bandwidth readings, round-trip times, downloaded segment data sizes, segment indices, segment media types, and other information.

Bandwidth estimator 604 may estimate the available bandwidth, round-trip time estimator 606 may estimate the round-trip time, network mode engine 608 may estimate the network mode, and packet loss ratio engine 610 may determine the packet loss ratio from the historical network condition metrics. Batch request decision manager 602 may consider the various estimates when determining whether to perform a batch request. In some embodiments, when the round-trip time is high and the available bandwidth is stable, batch request decision manager 602 may determine a batch request should be performed. Playback agent 108 may use the network mode and packet loss ratio to determine whether current bandwidth is stable or whether the round-trip time reading is high. For example, for an Ethernet network, playback agent 108 might expect the network is more likely to be stable with less round-trip time. In this case, playback agent 108 may set higher thresholds when judging round-trip time and bandwidth stability. For other network modes/packet loss ratios, playback agent 108 might adopt different thresholds. In some embodiments, batch request decision manager 602 may use one or more thresholds to determine whether to perform a batch request. If the round-trip time is above a threshold and the network bandwidth has been stable, batch request decision manager 602 may determine a number of segments to include in a batch request. Batch request decision manager 602 may use various methods to determine when to perform a batch request and also the number of segments. For example, batch request decision manager 602 may input the information received from bandwidth estimator 604, RTT estimator 606, network mode engine 608, and/or packet loss ratio engine 610 into a predictor to generate a decision. For example, the decision may be whether a batch request should be performed and the number of segments. Various predictors may be used, such as neural networks and/or rules based engines.

When requesting a video-on-demand media program 110, the batch request may be formed using ranges, such as byte ranges, for segments. Server 102 may store a single video-on-demand media program 110 as a single physical file instead of storing media program 110 in discreet small files. The segments in the file may be identified by ranges, such as byte ranges. The byte range may refer to a range of bytes within the file. Media player 106 modifies a byte range in a request header to instruct server 102 to return multiple segments in a single response. Server 102 returns a certain section of the media file based on the byte range so identified in the request header.

If the batch request is for four segments S3, S4, S5, and S6, at 614, byte ranges for segments S3, S4, S5, and S6 are shown at 614. For example, the S3 byte range is from 200-300 bytes in media program 110; the S4 byte range is from 300-400 bytes; the S5 byte range is from 400-500 bytes; and the S6 byte range is from 500-600 bytes. Typically, media player 106 would request segment S3 using the byte range 200-300, then request segment S4 using the byte range 300-400, and so on. However, when using a batch request, at 616, media player 106 merges the byte ranges for segments S3, S4, S5, and S6 together in a single request. For example, the batch request may request the byte range of 200-600, which covers the byte ranges for segments S3, S4, S5, and S6.

In some embodiments, batch request decision manager 602 may generate a byte range for media player 106. In other embodiments, media player 106 may generate the byte range. For example, batch request decision manager 602 may indicate segment identifiers to media player 106, and media player 106 determines the associated byte ranges for those segments.

When server 102 receives a batch request with a byte range 200-600, server 102 retrieves the segments associated with the byte range from a file. Then, server 102 sends segments associated with the byte range 200-600 without requiring an additional request for segments within the byte range.

Figure 7:
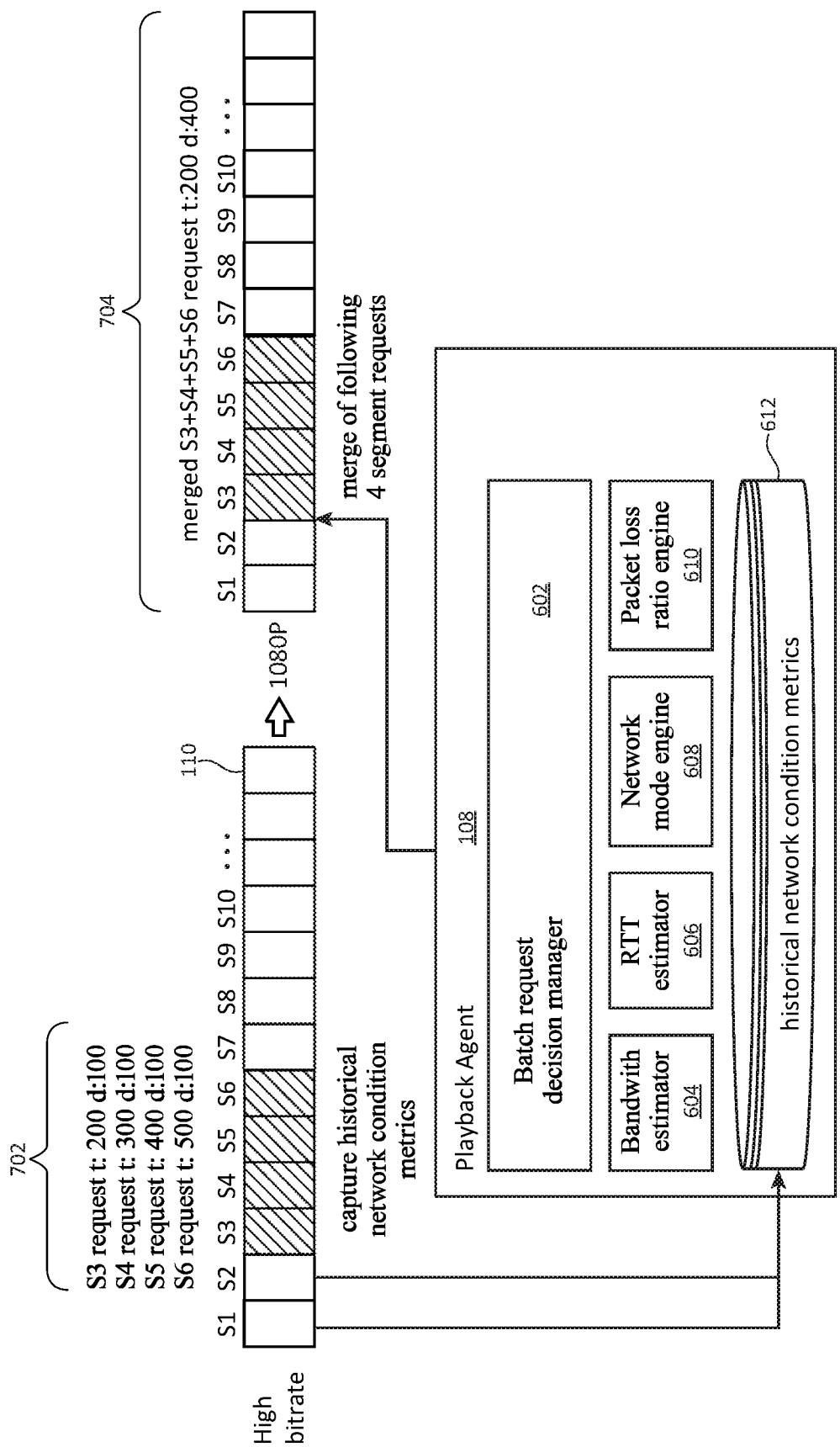
FIG. 7 depicts an example of using a batch request for a live media program according to some embodiments.

A batch request may be slightly different when downloading a live media program 110. FIG. 7 depicts an example of using a batch request for a live media program 110 according to some embodiments. For example, the protocol to request segments from a live media program 110 may be different. Instead of byte ranges, media player may use a time T and a duration D. A live video may be stored in one or more files in server 102. For example, as server 102 receives segments, server 102 stores the segments for media program 110 in one or more files. The times of a live segment serve as a key to locating the live segment in a file in server 102. The duration D of a live segment is the length of the segment.

Media player 106 specifies the time T and the duration D in parameters in a request that may be a uniform resource locator (URL). The time T and duration D indicate a live stream time range to return for media program 110 to server 102. The time T is the time start of a live segment and duration D specifies the preferred duration of the response. Whereas in the VOD case, media player 106 calculates the desired byte range and server 102 returns the requested portion of a file, in the live request case, server 102 maps the requested time range to one or more files. If media player 106 specifies a duration D parameter of whose value exceeds the duration of a single segment, server 102 may concatenate multiple segments into a single response whose duration is less than or equal to the duration D. In another embodiment, media player 106 may use a count C instead of a duration D parameter to successfully indicate the preferred number of segments to be returned in the response regardless of the duration.

At 702, when requesting single segments, a request for the segment S3 is based on a time and a duration. The time may be the start time of the segment in media program 110; the duration is the amount of time of the video in the segment. The request for the segment S3 may include a time of 200 and duration of 100, such as a time of 200 units into media program 110 and a duration of 100 units. The time duration may be in units, such as milliseconds, seconds, etc. The segment S4 request is from a time of 300 units with a duration with a duration of 100 units; segment S5 request is from a time of 400 units with a duration of 100 units; and the segment S6 is from a time of 500 units with a duration of 100 units. As can be seen, the start time of a subsequent segment is the time of the previous segment plus the duration of the previous segment.

At 704, when batch request decision manager 602 determines that a batch request is to be performed, batch request decision manager 602 determines a time and a duration for the batch request. When segments S3, S4, S5, and S6 are to be requested in a batch request, the time may be 200 and the duration is 400. Batch request decision manager 602 may take the time as the time of the earliest segment, such as segment S3, and the duration is the total of the durations for all the segments found in the batch request. Accordingly, when server 102 receives a batch request with the time 200 and the duration of 400, server 102 sends segments S3, S4, S5, and S6 in the batch request without requiring another request. Server 102 may concatenate all the full segments that satisfy the duration of 400 units starting at the time of 200 units.

Abort Batch Request Process

The batch request may be aborted due to various reasons. For example, playback agent 108 may determine that network conditions have changed such that the batch request should be aborted and a different profile should be used. That is, a batch request requests segments from the same profile, but if available bandwidth goes down, using that profile to continue to download segments may result in adverse playback experiences. Also, it is possible that available bandwidth may go up, and thus requesting a segment with a profile of a higher quality may be better, and the batch request may be aborted. The following description will be described when the batch request is aborted for a profile of a lower quality, but the batch request may be aborted to request a segment of a higher quality.

Figure 8:
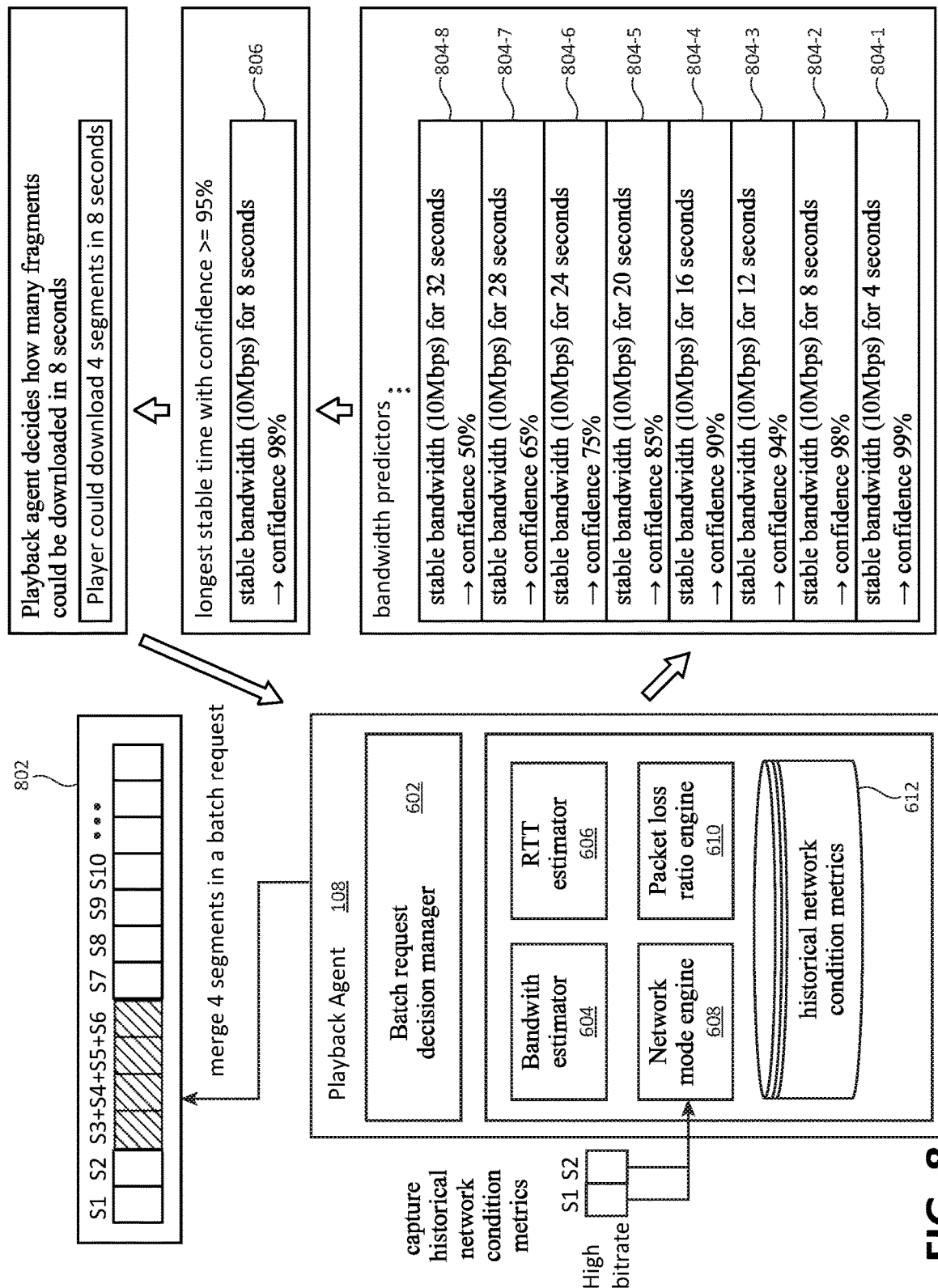
FIG. 8 depicts an example of determining the batch request according to some embodiments.
Figure 9:
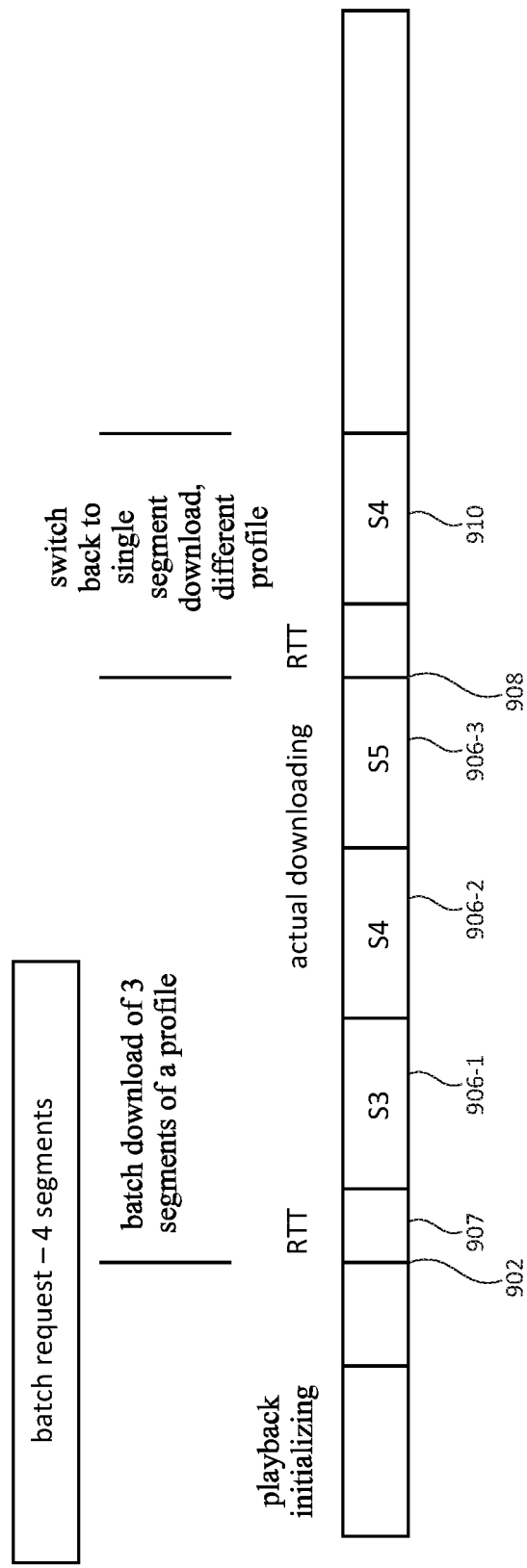
FIG. 9 depicts an example of aborting the batch request according to some embodiments.
Figure 10:
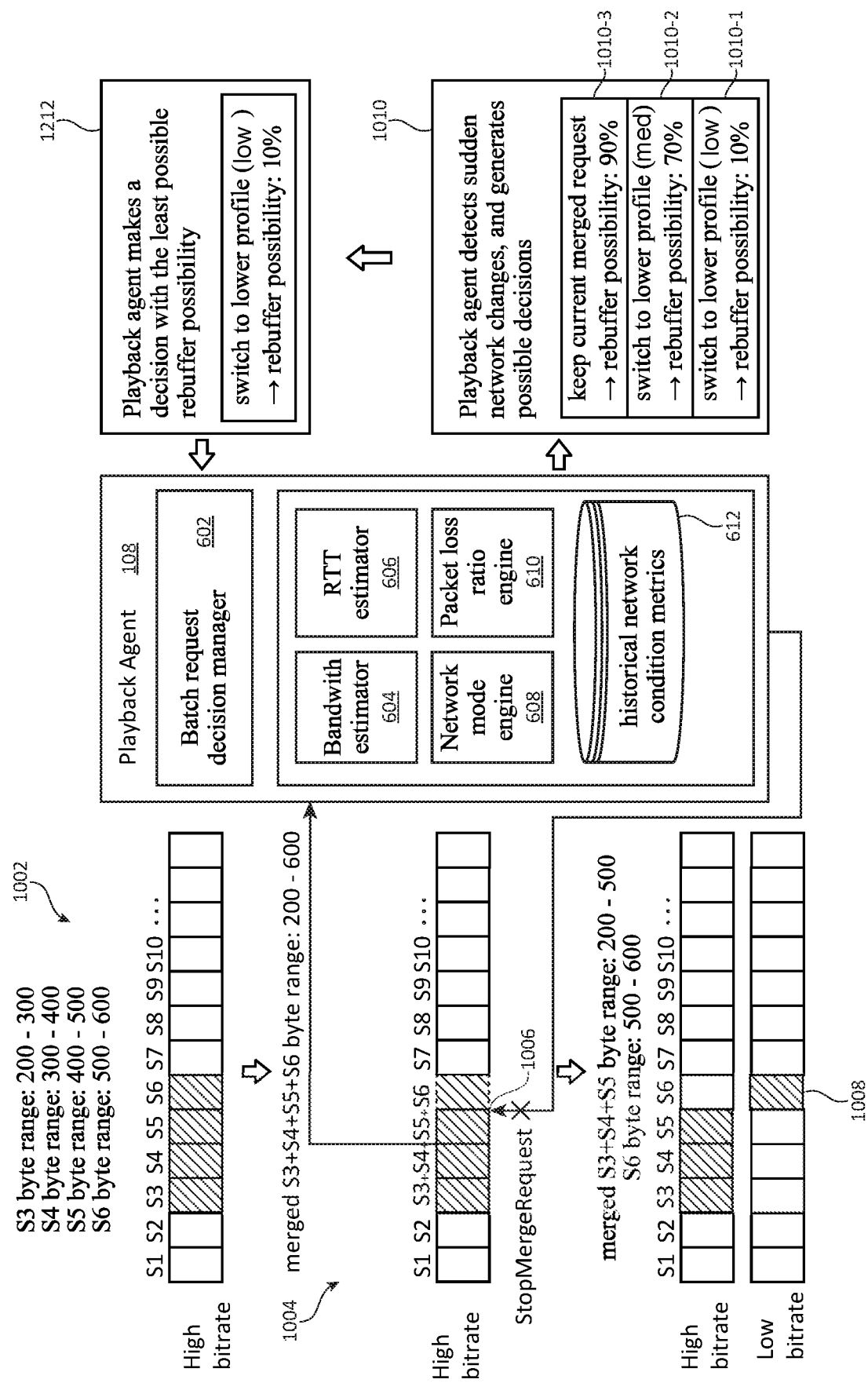
FIG. 10 depicts an example of a decision to abort the batch request according to some embodiments.

FIG. 8 depicts an example of determining the batch request according to some embodiments. FIGS. 9 and 10 depict the process for aborting a batch request according to some embodiments. After downloading a single segment, playback agent 108 reviews the historical bandwidth readings, and if it suggests stable bandwidth/high round-trip time, then playback agent 108 determines that a batch request should be performed. This determination contains both the batch request and the number of segments in a request. When playback agent 108 is confident that the network bandwidth is stable and round-trip times are above a threshold, then playback agent 108 determines that a batch request should be performed. Playback agent 108 decides that a batch request can be performed when it is confident network bandwidth is stable because the batch request requests a number of segments using the same profile. It would be undesirable to perform the batch request if network bandwidth is unstable and that the network bandwidth may change, such as that available bandwidth may go down, which would affect requesting segments from the same profile in the batch request. Also, the round-trip times are above a threshold, which saves an amount of time that may be significant. Although using the stable bandwidth and the round-trip times are discussed, playback agent 108 may use a batch request based on other factors, such as when available bandwidth is below a threshold. Using the batch request may use less bandwidth in a low bandwidth environment. Also, when determining that a batch request should be performed, playback agent 108 determines a number of segments for the batch request.

In FIG. 8, at 802, playback agent 108 determines the batch request that merges four segments in a batch request. At 804, playback agent 108 generates bandwidth predictions. For example, each bandwidth prediction may include whether the bandwidth will be stable or not, the amount of bandwidth, the length of time, and a confidence level. The amount of bandwidth may be X megabytes per second (Mbps), the length of time is how long the bandwidth will be stable, and the confidence level may reflect the confidence in the accuracy of the prediction. Different bandwidth predictions may be used from 804-1 to 804-8. As shown, as the time goes up, the confidence level that the bandwidth will remain stable for that long may go down. The confidence level may go down because it may be harder to predict over a longer period of time the different conditions that will be experienced.

Playback agent 108 may use bandwidth predictions from a set period of time, such as from the last X seconds or minutes. Then, playback agent 108 selects the longest stable time with a confidence level greater than or equal to a threshold. The prediction may be considered the longest time in which stable bandwidth may result with a confidence level that is acceptable. At 806, playback agent 108 determines the longest stable time with a confidence greater than a threshold, such as 95%. In this case, the longest stable time is eight seconds with a confidence level of 98%.

From the bandwidth prediction, playback agent 108 determines how many segments can be downloaded. Playback agent 108 may use the number of seconds in the prediction for the stable bandwidth to determine the number of segments that can be downloaded in that amount of time. If each segment is for two seconds, then media player 106 may be able to download four segments in eight seconds. Accordingly, playback agent 108 determines a batch request for four segments should be used. Although the above process is described for determining the number of segments, other methods may be used.

FIG. 9 depicts an example of aborting the batch request according to some embodiments. A batch request may download four segments with the best suitable profile. After successfully downloading three segments, playback agent 108 determines that it is unable to complete the rest of the request without re-buffering occurring because bandwidth drops to a lower level. At 902, media player 106 performs a batch request to download four segments. A round-trip time occurs at 904. Then, at 906-1, 906-2, and 906-3, the segments S3, S4, and S5 are downloaded. However, at 908, playback agent 108 determines that the batch request should be aborted. For example, at 908, media player 106 sends a request for a single segment at a different profile than that requested during the batch request. This stops the batch request and media player 106 downloads segment S4 at a different profile. The batch request may be aborted at 908 due to different factors, such as that the available bandwidth may go down and downloading segment S4 may result in re-buffering.

FIG. 10 depicts an example of a decision to abort the batch request according to some embodiments. At 1002, the individual segments and byte ranges are shown. Playback agent 108 determines to merge segments S3, S4, S5, and S6 in the byte ranges 200-600. Media player 106 sends the batch request for the byte range. However, at 1006, playback agent 108 determines that the batch request should be aborted. The abort request is determined after segment S5 is received. Accordingly, segment S6 is received at a different profile. For example, at 1008, segment S6 is received for the low bitrate profile, whereas segments S3, S4, and S5 are received at the profile associated with the high bitrate profile.

To determine when to abort the batch request, playback agent 108 generates predictions at 1010. For example, playback agent 108 may predict whether to switch to different profiles and predict a re-buffer possibility for each profile. At 1010-1, playback agent 108 generates a prediction for switching to a low bitrate profile with a re-buffer possibility of 10%. The re-buffer possibility indicates the probability that re-buffer would occur if a switch to a lower profile is performed. At 1010-2, playback agent 108 generates a prediction of a re-buffer possibility of 70% if a switch to a medium bitrate profile is performed. Then, at 1010-3, if the current batch request is kept, playback agent predicts the re-buffer possibility is 90%.

In some embodiments, playback agent 108 may compare the re-buffer possibility for keeping the current batch request to a threshold. If the re-buffer possibility is above a threshold, then playback agent 108 may determine that the batch request should be aborted. Then, at 1012, playback agent 108 may select a profile. For example, playback agent 108 determines a profile that has a re-buffer possibility below a threshold. In some examples, playback agent 108 may select the low bitrate profile, which has a re-buffer possibility of 10%. In other examples, playback agent 108 may select the profile with the lowest re-buffer possibility, such as the low bitrate profile, which has a 10% re-buffer possibility that is lower than the 70% re-buffer possibility for the medium bitrate profile. At this point, playback agent 108 instructs media player 106 to request the low bitrate profile for segment S6. Although the above process is described, other processes may be used to abort the batch request.

CONCLUSION

Accordingly, playback agent 108 can determine when a batch request may improve the playback experience. For example, times for round-trip times may be avoided by performing the batch request, which may be a better use of available bandwidth. Also, use of the batch request may save bandwidth, which may allow segments of a higher quality to be downloaded and improves the video quality of playback. Accordingly, the batch request may lower the possibility of re-buffering and also improve video quality.

EXAMPLE EMBODIMENTS

In some embodiments, a method comprising: analyzing, by a computing device, information regarding a round-trip time, wherein the round-trip time is based on sending a request for a segment of a media program and receiving the segment of the media program; determining, by a computing device, when to switch from requesting a single segment of the media program to sending a request that requests a plurality of segments of the media program; and when switching from requesting the single segment of the media program, sending, by the computing device, the request for the plurality segments of the media program, wherein at least two or more of the segments are received without sending a subsequent request for the two or more segments.

In some embodiments, a single request is sent to receive the plurality of segments of the media program.

In some embodiments, when requesting the single segment of the media program, a request for each segment of the media program is required resulting in a round-trip time of sending the request and receiving the segment of the media program for each segment.

In some embodiments, analyzing information regarding the round-trip time comprises: measuring an available bandwidth.

In some embodiments, analyzing information regarding the round-trip time comprises: measuring a metric based on the available bandwidth, wherein determining when to request the plurality of segments is when the metric meets a threshold.

In some embodiments, the metric comprises a measurement of stable bandwidth.

In some embodiments, analyzing information regarding the round-trip time comprises: measuring one or more round-trip times.

In some embodiments, the method further comprising: determining a round-trip time metric based on the measured one or more round-trip times; comparing the round-trip time metric to a threshold; and determining when to switch from requesting the single segment to sending the request that requests the plurality of segments of the media program when the round-trip time metric meets the threshold.

In some embodiments, sending the plurality segments of the media program comprises: determining a range in the media program for the plurality of segments; and sending the request for the plurality of segments of the media program using the range.

In some embodiments, sending the plurality segments of the media program comprises: determining a range of bytes in the media program for the plurality of segments; and sending the request for the plurality of segments using the range of bytes.

In some embodiments, sending the plurality segments of the media program comprises: determining a time and a duration of the plurality of segments in the media program for the plurality of segments; and sending the request for the plurality of segments using the time and the duration.

In some embodiments, sending the plurality segments of the media program comprises: determining a time and a count of the plurality of segments in the media program for the plurality of segments; and sending the request for the plurality of segments using the time and the count.

In some embodiments, the method further comprising: determining whether to abort the request for the plurality of segments of the media program; and sending a request for a single segment before at least one of the plurality of segments has been received.

In some embodiments, determining whether to abort the request for the plurality of segments comprises: measuring a metric based on aborting the request for the plurality of segments of the media program; and determining to abort the request for the plurality of segments of the media program when the metric meets a threshold.

In some embodiments, the metric comprises a rebuffering prediction, wherein rebuffering results when not enough video is stored in a buffer for playback of the media program.

In some embodiments, a non-transitory computer-readable storage medium containing instructions, that when executed, control a computer system to be operable for: analyzing information regarding a round-trip time, wherein the round-trip time is based on sending a request for a segment of a media program and receiving the segment of the media program; determining when to switch from requesting a single segment of the media program to sending a request that requests a plurality of segments of the media program; and when switching from requesting the single segment of the media program, sending the request for the plurality segments of the media program, wherein at least two or more of the segments are received without sending a subsequent request for the two or more segments.

In some embodiments, a single request is sent to receive the plurality of segments of the media program.

In some embodiments, when requesting the single segment of the media program, a request for each segment of the media program is required resulting in a round-trip time of sending the request and receiving the segment of the media program for each segment.

In some embodiments, the instructions are further configured for: determining a round-trip time metric based on the measured one or more round-trip times; comparing the round-trip time metric to a threshold; and determining when to switch from requesting the single segment to sending the request that requests the plurality of segments of the media program when the round-trip time metric meets the threshold.

In some embodiments, an apparatus comprising: one or more computer processors; and a non-transitory computer-readable storage medium comprising instructions, that when executed, control the one or more computer processors to be operable for: analyzing information regarding a round-trip time, wherein the round-trip time is based on sending a request for a segment of a media program and receiving the segment of the media program; determining when to switch from requesting a single segment of the media program to sending a request that requests a plurality of segments of the media program; and when switching from requesting the single segment of the media program, sending the request for the plurality segments of the media program, wherein at least two or more of the segments are received without sending a subsequent request for the two or more segments.

System

Figure 11:
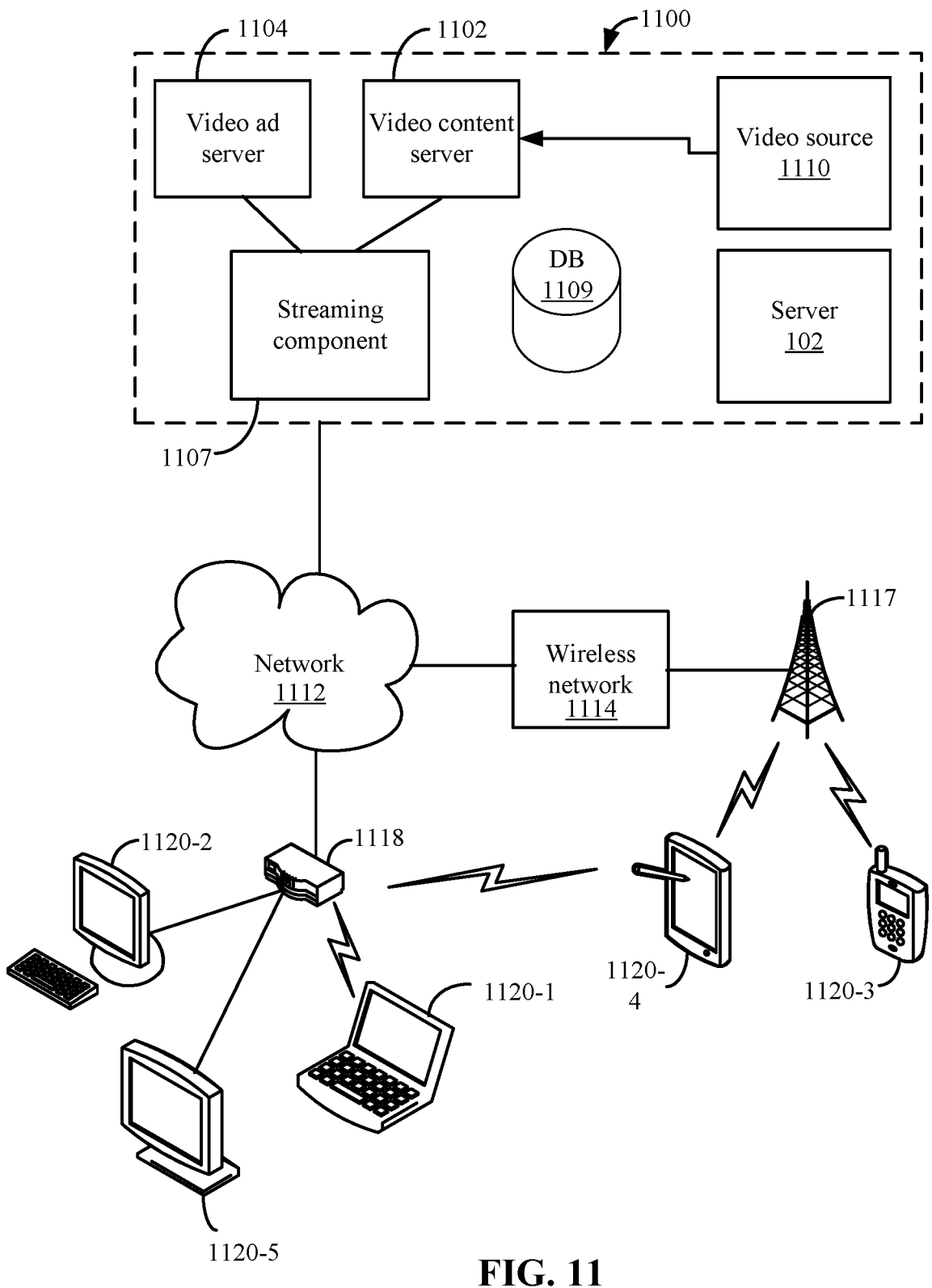
FIG. 11 depicts a video streaming system in communication with multiple client devices via one or more communication networks according to one embodiment.

Features and aspects as disclosed herein may be implemented in conjunction with a video streaming system 1100 in communication with multiple client devices via one or more communication networks as shown in FIG. 11. Aspects of the video streaming system 1100 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1100, video data may be obtained from one or more sources for example, from a video source 1110, for use as input to a video content server 1102. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1100 may include one or more computer servers or modules 1102, 1104, and/or 1107 distributed over one or more computers. Each server 1102, 1104, 1107 may include, or may be operatively coupled to, one or more data stores 1109, for example databases, indexes, files, or other data structures. A video content server 1102 may access a data store (not shown) of various video segments. The video content server 1102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1104 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1100, a public service message, or some other information. The video advertising server 1104 may serve the video advertising segments as directed by a user interface controller (not shown).

The video streaming system 1100 also may include server 102.

The video streaming system 1100 may further include an integration and streaming component 1107 that integrates video content and video advertising into a streaming video segment. For example, streaming component 1107 may be a content server or streaming media server. A controller (not shown) may determine the selection or configuration of advertising in the streaming video based on any suitable algorithm or process. The video streaming system 1100 may include other modules or units not depicted in FIG. 11, for example, administrative servers, commerce servers, network infrastructure, advertising selection engines, and so forth.

The video streaming system 1100 may connect to a data communication network 1112. A data communication network 1112 may comprise a local area network (LAN), a wide area network (WAN), for example, the Internet, a telephone network, a wireless cellular telecommunications network (WCS) 1114, or some combination of these or similar networks.

One or more client devices 1120 may be in communication with the video streaming system 1100, via the data communication network 1112, wireless cellular telecommunications network 1114, and/or another network. Such client devices may include, for example, one or more laptop computers 1120-1, desktop computers 1120-2, "smart" mobile phones 1120-3, tablet devices 1120-4, network-enabled televisions 1120-5, or combinations thereof, via a router 1118 for a LAN, via a base station 1117 for a wireless cellular telecommunications network 1114, or via some other connection. In operation, such client devices 1120 may send and receive data or instructions to the system 1100, in response to user input received from user input devices or other input. In response, the system 1100 may serve video segments and metadata from the data store 1109 responsive to selection of media programs to the client devices 1120. Client devices 1120 may output the video content from the streaming video segment in a media player using a display screen, projector, or other video output device, and receive user input for interacting with the video content.

Distribution of audio-video data may be implemented from streaming component 1107 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1107 may communicate with client device 1120 using control messages and data messages to adjust to changing network conditions as the video is played.

Since streaming component 1107 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1107 may use TCP-based protocols, such as HTTP. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 12:
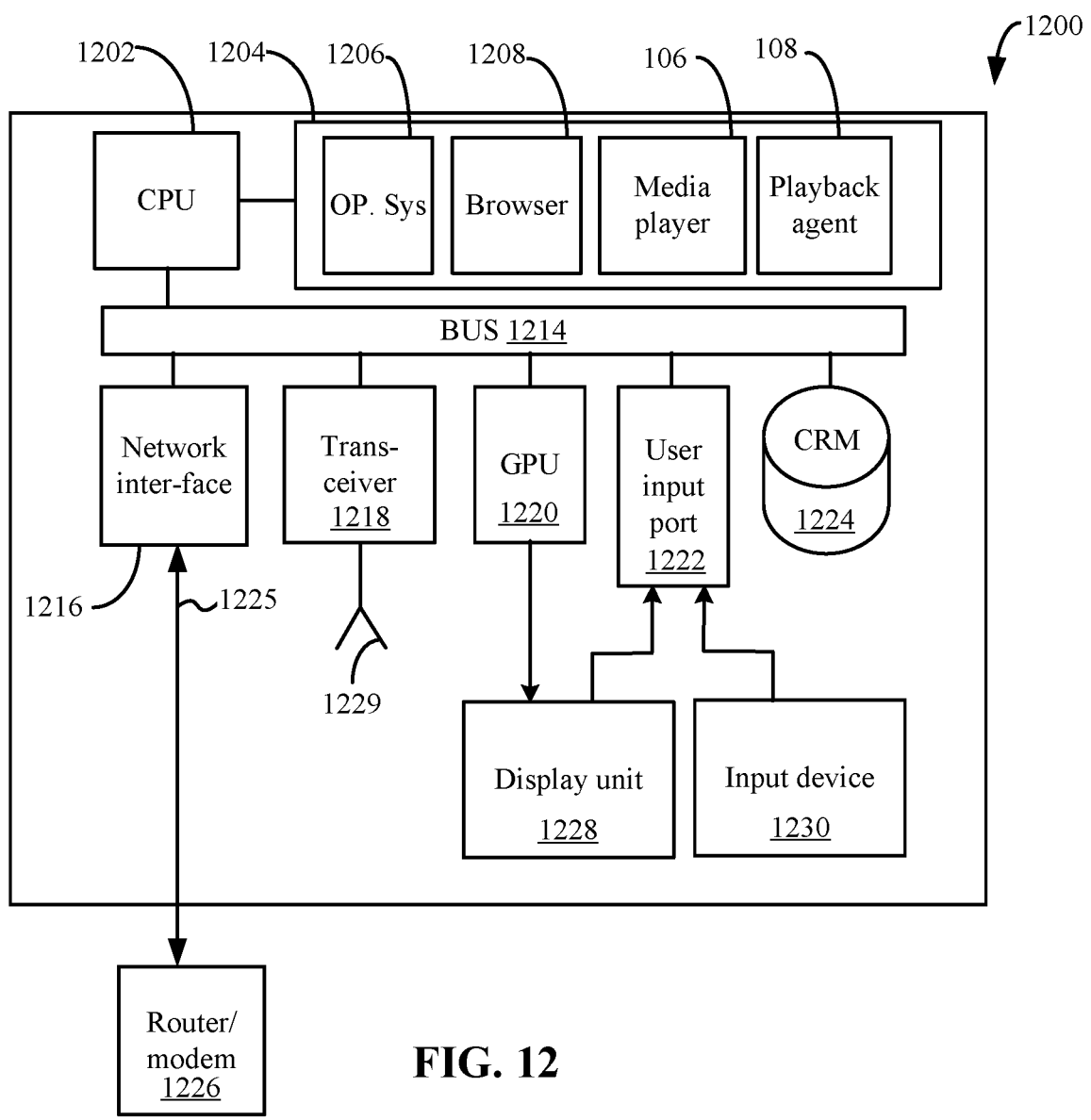
FIG. 12 depicts a diagrammatic view of an apparatus for viewing video content and advertisements.

Referring to FIG. 12, a diagrammatic view of an apparatus 1200 for viewing video content and advertisements is illustrated. In selected embodiments, the apparatus 1200 may include a processor (CPU) 1202 operatively coupled to a processor memory 1204, which holds binary-coded functional modules for execution by the processor 1202. Such functional modules may include an operating system 1206 for handling system functions such as input/output and memory access, a browser 1208 to display web pages, and media player 106 for playing video. The modules may further include playback agent 108. The memory 1204 may hold additional modules not shown in FIG. 12, for example modules for performing other operations described elsewhere herein.

A bus 1214 or other communication component may support communication of information within the apparatus

1200. The processor 1202 may be a specialized or dedicated microprocessor configured or operable to perform particular tasks in accordance with the features and aspects disclosed herein by executing machine-readable software code defining the particular tasks. Processor memory 1204 (e.g., random access memory (RAM) or other dynamic storage device) may be connected to the bus 1214 or directly to the processor 1202, and store information and instructions to be executed by a processor 1202. The memory 1204 may also store temporary variables or other intermediate information during execution of such instructions.

A computer-readable medium in a storage device 1224 may be connected to the bus 1214 and store static information and instructions for the processor 1202; for example, the storage device (CRM) 1224 may store the modules 1206, 1208, 1210 and 1212 when the apparatus 1200 is powered off, from which the modules may be loaded into the processor memory 1204 when the apparatus 1200 is powered up. The storage device 1224 may include a non-transitory computer-readable storage medium holding information, instructions, or some combination thereof, for example instructions that when executed by the processor 1202, cause the apparatus 1200 to be configured or operable to perform one or more operations of a method as described herein.

A communication interface 1216 may also be connected to the bus 1214. The communication interface 1216 may provide or support two-way data communication between the apparatus 1200 and one or more external devices, e.g., the streaming system 1100, optionally via a router/modem 1226 and a wired or wireless connection. In the alternative, or in addition, the apparatus 1200 may include a transceiver 1218 connected to an antenna 1229, through which the apparatus 1200 may communicate wirelessly with a base station for a wireless communication system or with the router/modem 1226. In the alternative, the apparatus 1200 may communicate with a video streaming system 1100 via a local area network, virtual private network, or other network. In another alternative, the apparatus 1200 may be incorporated as a module or component of the system 1100 and communicate with other components via the bus 1214 or by some other modality.

The apparatus 1200 may be connected (e.g., via the bus 1214 and graphics processing unit 1220) to a display unit 1228. A display 1228 may include any suitable configuration for displaying information to an operator of the apparatus 1200. For example, a display 1228 may include or utilize a liquid crystal display (LCD), touchscreen LCD (e.g., capacitive display), light emitting diode (LED) display, projector, or other display device to present information to a user of the apparatus 1200 in a visual display.

One or more input devices 1230 (e.g., an alphanumeric keyboard, microphone, keypad, remote controller, game controller, camera or camera array) may be connected to the bus 1214 via a user input port 1222 to communicate information and commands to the apparatus 1200. In selected embodiments, an input device 1230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1228, for example using a touch sensitive screen. A cursor control device may communicate direction information and command selections to the processor 1202 and control cursor movement on the display 1228. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   analyzing, by a computing device, time information regarding a round-trip time, wherein the round-trip time is based on sending a request for a segment of a media program and receiving the segment of the media program;
   determining, by the computing device, when to switch from requesting a single segment of the media program to sending a request that requests a plurality of segments of the media program based on the analyzing of the time information;
   when switching from requesting the single segment of the media program, sending, by the computing device, the request for the plurality segments of the media program;
   measuring, by the computing device, a metric based on aborting the request for the plurality of segments of the media program;
   determining, by the computing device, whether to abort the request for the plurality of segments of the media program by comparing the metric to a threshold;
   when the metric meets the threshold, performing:
      aborting, by the computing device, the request for the plurality of segments of the media program; and
      sending, by the computing device, a request for a single segment before all of the plurality of segments have been received.

2. The method of claim 1, wherein a single request is sent to receive the plurality of segments of the media program.

3. The method of claim 1, wherein when requesting the single segment of the media program, a request for each segment of the media program is required resulting in a round-trip time of sending the request and receiving the segment of the media program for each segment.

4. The method of claim 1, further comprising:
measuring an available bandwidth, wherein the available bandwidth is used to determine when to switch.

5. The method of claim 4, wherein the threshold comprises a first threshold, and wherein measuring the available bandwidth comprises:
measuring a metric based on the available bandwidth, wherein determining when to request the plurality of segments is when the metric based on the available bandwidth meets a second threshold.

6. The method of claim 5, wherein the metric based on the available bandwidth comprises a measurement of stable bandwidth.

7. The method of claim 1, wherein analyzing the time information regarding the round-trip time comprises:
measuring one or more round-trip times.

8. The method of claim 7, wherein:
the threshold comprises a first threshold,
analyzing the time information regarding the round-trip time comprises:
determining a round-trip time metric based on the measured one or more round-trip times; and
comparing the round-trip time metric to a second threshold; and
determining when to switch from requesting the single segment to sending the request that requests the plurality of segments of the media program is when the round-trip time metric meets the second threshold.

9. The method of claim 1, wherein sending the request for the plurality segments of the media program comprises:
determining a range in the media program for the plurality of segments; and
sending the request for the plurality of segments of the media program using the range.

10. The method of claim 1, wherein sending the request for the plurality segments of the media program comprises:
determining a range of bytes in the media program for the plurality of segments; and
sending the request for the plurality of segments using the range of bytes.

11. The method of claim 1, wherein sending the request for the plurality segments of the media program comprises:
determining a time and a duration of the plurality of segments in the media program for the plurality of segments; and
sending the request for the plurality of segments using the time and the duration.

12. The method of claim 1, wherein sending the request for the plurality segments of the media program comprises:
determining a time and a count of the plurality of segments in the media program for the plurality of segments; and
sending the request for the plurality of segments using the time and the count.

13. The method of claim 1, wherein the metric comprises a rebuffering prediction, wherein rebuffering results when not enough video is stored in a buffer for playback of the media program.

14. A non-transitory computer-readable storage medium containing instructions, that when executed, control a processor of a computer system to be operable for:
analyzing time information regarding a round-trip time, wherein the round-trip time is based on sending a request for a segment of a media program and receiving the segment of the media program;
determining when to switch from requesting a single segment of the media program to sending a request that requests a plurality of segments of the media program based on the analyzing of the time information;
when switching from requesting the single segment of the media program, sending the request for the plurality segments of the media program;
measuring a metric based on aborting the request for the plurality of segments of the media program;
determining whether to abort the request for the plurality of segments of the media program by comparing the metric to a threshold;
when the metric meets the threshold, performing:
aborting the request for the plurality of segments of the media program; and
sending a request for a single segment before all of the plurality of segments have been received.

15. The non-transitory computer-readable storage medium of claim 14, wherein a single request is sent to receive the plurality of segments of the media program.

16. The non-transitory computer-readable storage medium of claim 14, wherein when requesting the single segment of the media program, a request for each segment of the media program is required resulting in a round-trip time of sending the request and receiving the segment of the media program for each segment.

17. The non-transitory computer-readable storage medium of claim 14, wherein:
the threshold comprises a first threshold,
analyzing the time information regarding the round-trip time comprises:
determining a round-trip time metric based on the measured one or more round-trip times; and
comparing the round-trip time metric to a second threshold; and
determining when to switch from requesting the single segment to sending the request that requests the plurality of segments of the media program is when the round-trip time metric meets the second threshold.

18. The non-transitory computer-readable storage medium of claim 14, wherein at least two or more of the segments are received without sending a subsequent request for the two or more segments.

19. The non-transitory computer-readable storage medium of claim 14, wherein the metric comprises a rebuffering prediction, wherein rebuffering results when not enough video is stored in a buffer for playback of the media program.

20. An apparatus comprising:
one or more computer processors; and
a non-transitory computer-readable storage medium comprising instructions, that when executed, control the one or more computer processors to be operable for:
analyzing time information regarding a round-trip time, wherein the round-trip time is based on sending a request for a segment of a media program and receiving the segment of the media program;
determining when to switch from requesting a single segment of the media program to sending a request that requests a plurality of segments of the media program based on the analyzing of the time information;
when switching from requesting the single segment of the media program, sending the request for the plurality segments of the media program;
measuring a metric based on aborting the request for the plurality of segments of the media program;
determining whether to abort the request for the plurality of segments of the media program by comparing the metric to a threshold;

when the metric meets the threshold, performing:
  aborting the request for the plurality of segments of the media program; and
  sending a request for a single segment before all of the plurality of segments have been received.

\* \* \* \* \*